United States Patent [19]

Friedman et al.

[11] Patent Number: 4,898,750

[45] Date of Patent: Feb. 6, 1990

[54] PROCESSES FOR FORMING AND USING PARTICLES COATED WITH A RESIN WHICH IS RESISTANT TO HIGH TEMPERATURE AND HIGH PH AQUEOUS ENVIRONMENTS

[75] Inventors: Robert H. Friedman; Billy W. Surles, both of Houston, Tex.

[73] Assignee: Texaco Inc., White Plains, N.Y.

[21] Appl. No.: 280,066

[22] Filed: Dec. 5, 1988

[51] Int. Cl.$^4$ ............................................... B05D 7/00
[52] U.S. Cl. .................................... 427/221; 166/276; 166/280; 166/295; 252/8.551
[58] Field of Search .................. 166/280, 276, 295; 252/8.551; 427/221; 428/404, 407

[56] References Cited

U.S. PATENT DOCUMENTS

| | | | |
|---|---|---|---|
| 4,607,067 | 8/1986 | Ohashi et al. | 164/527 X |
| 4,669,543 | 6/1987 | Young | 166/276 |
| 4,785,884 | 11/1988 | Armbruster | 166/280 |

*Primary Examiner*—Michael Lusignan
*Attorney, Agent, or Firm*—Jack H. Park; Kenneth R. Priem

[57] ABSTRACT

We have found that it is possible to produce resin coated particular matter having uniform coating of resin to protect the particles against erosion or dissolution on contact with high pH fluids. The coated sand or other particles is produced by introducing the particles into a mixing device, to which is added a resin mixture comprising a urea formaldehyde resin and a furfural alcohol resin. The sand and resin mixture is mixed for sufficient time to accomplish uniform coating of the sand particle with the resin mixture. Next a foaming aqueous surfactant containing fluid is added which causes the resin-coated sand particles to be suspended in the foaming aqueous mixture. The surfactant fluid also contains acid catalyst. This mixture is allowed to set for a period of time after which the coated particles are washed and then cured at 300° C. to accomplsih drying and complete the polymerization reaction. Coated sand grains are highly resistant to prolonged contact with strong alkaline fluids such as are encountered in subterranean formations being stimulated by injection of hot alkaline fluids.

22 Claims, No Drawings

PROCESSES FOR FORMING AND USING PARTICLES COATED WITH A RESIN WHICH IS RESISTANT TO HIGH TEMPERATURE AND HIGH PH AQUEOUS ENVIRONMENTS

FIELD OF THE INVENTION

This invention is an improved process for coating particulate matter, such as sand, with a resin mixture in a foaming aqueous solution to produce a cured resin-coated particulate matter which is useful in oil production operations where the particulate matter is exposed to high temperature and/or high pH environments such as in steam stimulation of viscous oil formations.

BACKGROUND OF THE INVENTION

Fracturing is widely used in oil and gas production operations as a means of increasing the productivity of wells completed in oil field formations. This process ordinarily involves forcing liquids into the well under high pressures which open cracks in the formations surrounding the well. While maintaining pressure, solid particulate materials are introduced into the freshly formed fractures to prop them open so the fractures will not close or heal after the pressure has been removed.

Sand is frequently used as a propping agent in hydraulic fracturing operations applied to oil wells. Sand is relatively inexpensive and, when suspended in a suitable carrier liquid, can readily be introduced into the fractures. Ordinary sand can be used as a propping agent except in special situations. For example, in very deep producing formations, stronger propping agents are required because the greater overburden pressure tends to crush certain common materials including most sand available for this purpose. In other situations, when sand is used as a fracture proppant in formations being stimulated by steam and/or alkaline fluid injection, the hot alkaline fluids dissolved the sand, allowing the fractures to heal.

Another production problem frequently encountered in oil production activities involves the packing of particulate matter including sand or gravel into areas adjacent to an oil production formation to form what is commonly referred to in the industry as a "gravel pack", which is a permeable sieve around the production well. This screen permits passage of fluids therethrough while restraining the flow of unconsolidated sand into the formation. Sand flow into a producing well can cause serious and costly problems because the well will sometimes fill completely with sand and cease producing. In other instances, the sand produced from the formation flows to the surface of the earth and causes very high rates of wear in pumps and other mechanical goods through which the produced fluid passes. It is common practice to perform procedures in producing wells completed in formations containing unconsolidated sand to restrain the flow of sand from the formation into the well, and one of the commonly used procedures involves placing sand or gravel inside of metal screens attached to the production tubing, which functions as an effective filter for unconsolidated particulate matter from the formation.

When viscous oil containing formations are stimulated thermally, as by steam flooding, serious problems develop in connection with the use of ordinary uncoated sand in fracturing operations or in sand packed screens used to control unconsolidated sand flow from formations. Very often, caustic substances are used in combination with steam or other heated fluids to stimulate production of viscous petroleum. Although sand is ordinarily considered to be inert, it is eroded or slowly dissolved by the passage of hot, high pH fluids through the sand packed areas when fluids are recovered from oil formations being stimulated by steam flooding. The result is that the sand utilized in either as a proppant in fracturing operations or as the pack in a gravel or sand pack completion is slowly dissolved, until it no longer functions either as a proppant or as a filter medium in the sand packed screen. In order to eliminate this problem, it is necessary to utilize some material more resistant than sand to the high pH environment present when fluids are being recovered from formations during steam flooding or to coat sand with polymeric material which increases the resistance to high pH fluids such as are encountered in steam flooding operations. Although techniques have been disclosed in the literature for the purpose of coating sand, most procedures are intended to increase the physical strength of the sand in order to permit its use in fracturing operations in very deep wells. The coating which solves that problem is not effective for reducing the sensitivity of sand to high pH fluid flow conditions such as are described above. Accordingly, it can be appreciated that there is a substantial unfulfilled need for a method for forming polymer coated sand or other aggregate for use in propping fractures formed in formations being subjected to thermal stimulation, or for use in forming sand packs or gravel packs to reduce sand flow from formations being stimulated by thermal methods.

PRIOR ART

U.S. Pat. No. 3,492,147 describes a method for coating particulate solids with an infusible resin, specifically furfural alcohol by heating the solids and the resin to a temperature greater than the melting point and then suspended the coated solids in an oil bath containing a catalyst which causes the resin to cure on the particles.

U.S. Pat. No. 4,439,489 describes a method for coating particulate matter with a thermoset phenolic resin to increase the crush strength of the sand so that it may be used in deep well fractures as a proppant.

Other prior art references teaching the coating of sand particles with flexible or strength-increasing coatings include 3,026,938; 3,929,191; 3,935,339; and 3,492,147. All of these process are aimed at producing a coated sand particle having increased structural strength and/or using different procedures for forming the coated particulates, but the coatings are not satisfactory for improving the resistance of the particle to contact with hot, high pH fluids such as are involved in thermal oil recovery methods.

SUMMARY OF THE INVENTION

We have found that it is possible to produce the desired uniform coating of sand particles necessary to protect against erosion or dissolution on contact with high pH fluids by coating the particles with a resin mixture in a foaming, surfactant containing aqueous solution. We have found that the desired resistance is not obtained using either resin alone, but only when a critical mixture of resins is employed to coat the sand grains. The coated sand is produced by introducing sand into a mixing device, to which is added a resin mixture comprising a urea formaldehyde resin and a furfural alcohol resin. The sand and resins are mixed for sufficient time to coat the sand particle with resins uniformly. Next a foaming aqueous surfactant and acid catalyst containing fluid is added which causes the resin-coated sand particles to be suspended in the foaming aqueous mixture. This mixture is allowed to set for a period of time to permit curing of the resins after which the coated sand is washed and then cured at 300° F. to accomplish drying and complete the polymerization reaction. Sand grains coated by this process are highly resistant to prolonged contact with hot and/or alkaline fluids such as are encountered in subterranean formations being stimulated by injection of hot alkaline fluids.

DETAILED DESCRIPTION OF THE INVENTION

Particulate matter used in the practice of this invention can be any of several commercially available solid materials, which are routinely used as propping agents in fracturing operations or in the formation of gravel packs for sand control. These materials include sand, sintered bauxite, zircon and glass beads. The particulate matter should be resistant to melting or decomposition at temperatures below about 300° F., and preferably are of a relatively uniform size. Particle sizes commonly employed vary from 10 to 100 mesh (U.S. Standard Screen Sizes) with ideal mesh size being about 20 to 40 mesh. Sand is a particularly preferred articulate matter, since it is relatively inexpensive, structurally strong, and readily available in the size ranges described above which are especially suitable for use in our invention.

Two resins are utilized in combination to produce the coated particles described herein. One is a urea formaldehyde type resin such as that commercially available from Q. O. Chemicals. The second resin is a furfural alcohol oligomer such as that obtained from QO Chemicals and designated as Quacorr 1300 BA. Although some variation in the ratio of these two resins can be used, we have found that a 1:1 mixture produces optimum results.

The surfactants employed in the aqueous solution into which the particles coated with the above described resin mixture are added, may be any surfactant for dispersing the coated particles and for forming a relatively stable aqueous foam. We have found that a mixture of toluene sulfonic acid and dodecylbenzene sulfonic acid are especially effective for this purpose.

Since both resins employed above are acid catalyzed, the coated particle should also be contacted with an acid catalyst in order to promote polymerization of the resin on the surface of the sand particles while the particles are suspended in the foaming aqueous solution. We have found that while any acid catalyst could be used, the best results were obtained when the aqueous solution contained both $H_2SiF_6$, or hydroflurosilisic acid, and phosphoric acid, $H_3PO_4$.

If the particulate matter, e.g., sand coated with the resin mixture described above were simply introduced into an aqueous fluid containing the acid catalyst described above, the sand grains would stick together and a hard mass of consolidated sand would result. For the present purpose, it is desired that the particles be suspended for a period of time sufficient to allow the polymerization of the two resins to proceed to completion, and for this purpose, a foaming aqueous surfactant solution is employed. An ordinary laundry detergent such as "Tide ®" may be employed for this purpose dose. For laboratory purposes, we used the mixture of toluene sulfonic acid and dodecylbenzene sulfonic acid.

Mixing of the fluid induced the formation of foam due to incorporation of air from the atmosphere into the fluid mixture. Blowing air or other gas directly into the liquid to increase foam development may be used on a commercial scale. A stable foam is necessary to keep the uncured resin particles separated from one another long enough to permit the acid catalyzed polymerization reaction to proceed to a stable point at or near completion of the polymerization reaction, after which the coated sand can be washed with water or other suitable means to remove the residual unreacted acid as well as the surfactants. Finally, the coated sand materials are cured to a dry and stable form by heating at a temperature in the range of 300° F. to 350° F. for a period of time from 14 to 16 hours.

As a general guideline, for each 100 parts of sand or other particulate material to be utilized in this procedure, from 2 to 3 parts of the resin mixture should be added and the materials mixed together to uniformly coat the resin particles. Ordinarily the ratio of the urea formaldehyde resin to the furfural oligomer resin is from 0.75 to 1 to 1 to 0.75 with a 1:1 mixture being preferred.

The resin-coated sand is then mixed with the aqueous solution containing acid surfactant and water in a weight ratio of about 7 to 9 parts of aqueous solution per 100 parts of sand. The preferred concentration of the phosphoric acid is from 9 to 10 percent and the concentration of $H_2SiF_6$ should be in the range of from 0.9 to 0.1.

The concentration of the surfactant mixture should be from about 2 to 3 percent, and the water content of the aqueous fluid should be about 75 to 80.

It is preferred that the mixture of resin coated sand, together with the aqueous solution of surfactant and acid catalyst should be allowed to stand at ambient temperatures for a period of time in the range of from $\frac{1}{2}$ to 1 hour. This allows the acid catalyzed polymerization reaction to proceed to a relatively stable point, after which the resin coated sand particles do not readily stick together. They should then be washed with water or other suitable fluids to remove the residual surfactant and unreacted acid. In order to ensure that the reaction has proceeded to a point where no sticking would occur if the resin coated sand particles are stored for extended periods of time, it is preferred that they be cured by exposing them to temperatures in the range of 300° F. to 350° F. for a period of time in the range of from 12 to 16 hours.

EXAMPLE

For the purpose of complete disclosure including what we contemplate to be the preferred mode of operating according to our invention, the following example is offered.

500 grams of 20 to 40 mesh Ottawa sand were introduced into a mixer. To the sand was added 10 grams of 1:1 resin mixture comprising QO Chemical Company's urea formaldehyde resin and QO's Quacorr 1300 BA, an oligomer of furfural alcohol. The sand and resin mixture were then mixed at a moderate speed in the mixer in order to coat the sand grains uniformly with the resin mixture. Immediately thereafter, 40 grams of a catalyst surfactant water solution were added to the resin coated sand and the mixture was mixed at high speed until a maximum volume foam was obtained. The catalyst surfactant water solution was formulated by adding 3.53 grams of $H_3PO_4$ (85% purity), 0.39 grams of $H_2SiF_6$ (40% purity), 1.8 grams of of toluene sulfonic acid, 1 gram of dodecylbenzene sulfonic acid, and 33.28 grams of water.

The above described stable foam containing the resin coated sand and the aqueous solution of acid catalyst and surfactant were allowed to stand at laboratory temperatures overnight, a period of about 16 hours. The sand could easily be handled and did not tend to stick together at this time. The resin coated sand particles were then washed with water and cured in an oven at 300°F. for approximately 16 hours. The resultant material was uniformly coated with resin and very dry to the touch with no tendency for the resin coated particles to stick together.

An experiment was conducted to test the alkaline resistivity of the resin coated sand. 50 grams of coated sand was placed in a container to which was added 100 grams of a 50% sodium hydroxide solution and the sand and sodium hydroxide was heated to a temperature of 90° C. and held at that temperature for several hours. An identical 50 gram sample of uncoated sand was added to a separate container, and mixed with 100 grams of sodium hydroxide solution and heated as described above for the coated sand sample.

After the above described samples were heated for several hours, the uncoated sand solution was quite murky due to the dissolution of sand in the hot alkaline environment, while the coated sodium hydroxide solution was completely clear and the particles exhibited no indication of dissolution in the high pH fluid environment.

Sand or other particular matter coated in accordance with our invention described in detail above, may be utilized as the proppant in a hydraulic fracture operation being applied to subterranean formations where the proppant will be exposed to high pH environments, such as when used in formations being stimulated with steam. The resin coated sand particles prepared in accordance with the above description may also be utilized to prepare gravel pack screens for use in completing a producing well in a formation being stimulated by steam flooding, without concern that the particles will be rapidly dissolved or eroded by passage of high pH fluids through the sand screen.

We have disclosed above a procedure and process by which particles may be individually coated with a uniform, high pH fluid resistant resin which vastly increases the resistance of the particles to the detrimental effect of exposure to alkaline fluids such as are encountered in producing wells completed in formations being stimulated by thermal flooding in which hot and/or alkaline fluids are introduced into the formation to increase the production of viscous petroleum from the formation. This satisfies the objectives and unfulfilled needs described earlier herein. While our invention has been described in terms of a number of specific illustrative embodiments, it is evident to person skilled in the art that many alternatives and modifications may be made to the above disclosure without departing from the true spirit and scope of our invention. Accordingly, it is our desire an intention that all such alternatives, modifications, and variations as are within the scope of the appended claims and the spirit of our invention are included herein.

We claim:

1. A process for preparing particulate matter coated with a cured, alkaline fluid resistant resin comprising:

(a) contacting particulate matter with a mixture of effective amounts of urea formaldehyde resin and a furfural oligomer resin;
    (b) mixing the particulate matter and resins sufficiently to coat the particulate matter uniformly with a resin;
    (c) contacting the resin-coated particulate matter with an aqueous solution of surfactant and an acid catalyst for the resin;
    (d) mixing the resin-coated particulate matter and aqueous solution of acid and surfactant at a speed sufficient to form a foam; and
    (e) allowing the mixture of resin coated particulate matter and the foaming aqueous acid and surfactant fluid to stand for a period of time sufficient to cause polymerization of the resin on the resin coated particulate matter.
    (f) cleaning the residual acid and surfactant fluid from the surface of the particulate matter; and
    (g) heating the resin coated particulate matter to a temperature of from 300°0 F. to 350° F. for a period of time sufficient to cure the resin to a state at which the particulate matter will not stick together.

2. A method as recited in claim 1 wherein the ratio of urea formaldehyde to furfural alcohol is from 0.75 to 1 to 1 to 0.75.

3. A method as recited in claim 2 wherein the ratio of urea Formaldehyde to furfural alcohol is about 1:1.

4. A method as recited in claim 1 wherein the weight ratio of resin mixture to particulate matter is from 2 to 3%.

5. A method as recited in claim 1 wherein the weight ratio of resin mixture to particulate matter is from 2 to 3%.

6. A method as recited in claim 1 wherein the acid catalyst incorporated in the aqueous fluid is phosphoric acid.

7. A method as recited in claim 1 wherein the acid catalyst incorporated in the aqueous fluid is $H_2SiF_6$.

8. A method as recited in claim 6 wherein the ratio of phosphoric acid to resin-coated sand is from 0.7 to 0.8%.

9. A method as recited in claim 7 wherein the weight ratio of $H_2SiF_6$ to resin-coated sand is from 0.065 to 0.075%.

10. A method as recited in claim 1 wherein the surfactant comprises toluene sulfonic acid.

11. A method as recited in claim 10 wherein the weight ratio of toluene sulfonic acid to particulate matter is from 0.3 to 0.35%.

12. A method as recited in claim 1 wherein the aqueous surfactant fluid comprises dodecylbenzene sulfonic acid.

13. A method as recited in claim 12 wherein the weight ratio of dodecylbenzene sulfonic acid to particulate matter is from 0.18 to 0.20%.

14. A method as recited in claim 1 wherein the acid and surfactant are mixed with water and the ratio of water to the resultant mixture is from 70 to 80.

15. A method as recited in claim 1 wherein the mixture of particulate matter and the foaming aqueous mixture of surfactant and acid are allowed to stand for a period of time in the range of from ½ to 1 hour to permit more complete polymerization of the resin coating on the particulate matter.

16. A method as recited in claim 1 wherein the resin coated sand is cleaned by washing it with water.

17. A method as recited in claim 1 wherein the resin coated sand is finally cured by heating it to a temperature in the range of 300° F. to 350° F. for a period of time or from 12 to 16 hours.

18. A method as recited in claim 1 wherein the particulate matter is sand.

19. A method as recited in claim 18 wherein the mesh size of the sand is from 10 to 100 mesh.

20. A method as recited in claim 18 wherein the particle size of the sand is from 20 to 40 mesh.

21. A method as recited in claim 1 comprising the additional step of introducing gas into the aqueous solution of acid and surfactant to increase the formation of foam.

22. A method as recited in claim 21 wherein the gas is air.

* * * * *

UNITED STATES PATENT AND TRADEMARK OFFICE
CERTIFICATE OF CORRECTION

PATENT NO. : 4,898,750
DATED : February 6, 1990
INVENTOR(S) : ROBERT HAROLD FRIEDMAN and BILLY WAYNE SURLES It is certified that error appears in the above-identified patent and that said Letters Patent is hereby corrected as shown below:

Claim 1 (g), Column 6, line 21 delete "300°0F."

and substitute therefor -- 300--.

Signed and Sealed this

Ninth Day of April, 1991

Attest:

HARRY F. MANBECK, JR.

Attesting Officer

Commissioner of Patents and Trademarks